United States Patent [19]

Sulick

[11] 4,284,547
[45] Aug. 18, 1981

[54] WATER-IN-RESIN EMULSIONS CONTAINING POLYESTER RESINS

[76] Inventor: Richard C. Sulick, 3821 Dill Rd., Drayton Plains, Mich. 48020

[21] Appl. No.: 163,261

[22] Filed: Jun. 26, 1980

[51] Int. Cl.$^3$ ............................................. C08L 67/06
[52] U.S. Cl. .................... 260/29.6 NR; 260/29.2 UA; 260/29.6 MM; 260/29.6 MN; 260/29.6 WQ; 521/65; 525/43; 525/48; 525/49; 526/173; 526/322; 526/911
[58] Field of Search ............. 260/29.6 NR, 29.6 MM, 260/29.6 WQ, 29.6 MN, 29.2 UA; 525/43, 48, 49; 526/173, 322, 911; 521/65

[56] References Cited

U.S. PATENT DOCUMENTS

| | | | |
|---|---|---|---|
| 3,539,479 | 11/1970 | Alberts | 260/22 |
| 3,687,883 | 8/1972 | Korf | 260/29.6 NR |
| 3,779,966 | 12/1973 | Weeks et al. | 260/29.6 NR |
| 4,077,931 | 3/1978 | Leitheiser et al. | 260/29.6 NR |

Primary Examiner—John Kight, III
Attorney, Agent, or Firm—Squire, Sanders & Dempsey

[57] ABSTRACT

A water-in-resin emulsion for producing a porous plastic is comprised of a mixture of water dispersed in discrete droplets uniformly throughout a continuous phase of a resinous copolymerizable composition which includes a copolymerizable mixture containing a liquid unsaturated polyester of a polyhydric alcohol and saturated and ethylenically unsaturated dicarboxylic acids and a compound having a polymerizable $CH_2=C<$ group, wherein the copolymerizable mixture has a molecular weight in the range of from about 2500 to about 3500; a cobalt salt promoter in an amount within the range of from about 0.25 to about 0.5% based on the weight of the copolymerizable mixture; a tertiary aromatic amine accelerator in an amount within the range of from about 0.75 to about 1.75% based on the weight of the copolymerizable mixture; and, a lithium salt emulsifier in an amount within the range of from about 0.5 to about 1.5% based on the weight of the copolymerizable mixture.

3 Claims, No Drawings

WATER-IN-RESIN EMULSIONS CONTAINING POLYESTER RESINS

BACKGROUND OF THE INVENTION

1. Field of the Invention

The present invention relates, generally, to water-in-resin emulsions wherein water is dispersed in discrete droplets throughout a continuous resinous phase comprised of a copolymerizable mixture of an unsaturated polyester resin, which emulsion is designed to be cured to a porous plastic article. More specifically, the present invention relates to an improvement in the nature of the continuous phase of such an emulsion whereby the promoter system for the polyester resin corresponds generally to promoters for polyester resins in a nonaqueous environment.

2. Description of the Prior Art

Water-in-resin emulsions designed to produce porous plastic parts upon the cure of the resin component have been known for quite some time. Conventionally, an emulsion of water dispersed in discrete droplets throughout a continuous phase comprising an unsaturated polyester resin is cured in a mold having the shape of a desired product whereby the water droplets are trapped in the solid, thermoset polyester composition to yield voids or cells therein. By appropriate manipulation of variables, the dispersed aqueous phase may be trapped in non-communicating cells or allowed to escape from the part through a network of communicating cells. Conventional filler materials, such as hydrated alumina, are sometimes also added to the emulsion mixture prior to cure.

There have been some problems with known water-in-resin emulsions of the character aforesaid, particularly in respect of maintaining good emulsion stability before cure of the resin and, following catalysis, insuring an acceptable gel time. Most manufacturers using these emulsions to fabricate porous plastic articles desire as rapid a cure as possible. Typically, gel times of less than five minutes are necessary, less than three minutes desirable, and on the order of one to two minutes most preferred.

Those skilled in this art have determined that the promoters normally used to cure polyester resins do not give satisfactory results when water is emulsified with the resin to form these porous plastic parts. Various workers, such as the inventors in U.S. Pat. No. 4,077,931, have said that cobalt promoters are especially sensitive to the presence of water and, in these emulsions, the amount of cobalt which must be employed to give satisfactory results is considerably more than in nonaqueous environments, ranging up to about 5 to 10 times that typically employed.

The use of substantial quantities of cobalt promoters, such as cobalt octoate or cobalt naphthenate, gives adequate results in promoting the cure of the polyester component of the emulsion. There is, however, a significant disadvantage in that cobalt is a very expensive commodity. Reducing the amount of cobalt needed to cure effectively a water-in-resin emulsion without loss of emulsion stability during cure is very desirable.

SUMMARY OF THE INVENTION

The present invention advantageously allows a significant reduction in the amount of cobalt promoter for a polyester resin having dispersed therein droplets of water or other aqueous solutions without a concomitant decrease in either emulsion stability or gel time of the emulsion following addition of a curing catalyst. The curing system employed in the present invention is substantially the same as that heretofore utilized in the cure of unsaturated polyesters in nonaqueous environments.

Surprisingly, it has been learned that a water-in-resin emulsion including a liquid unsaturated polyester resin having a molecular weight in the range of from about 2500 to about 3500 may be cured by catalysis with a peroxide catalyst promoted by a cobalt salt promoter present in an amount within the range of from about 0.25 to about 0.5%, which promoter is accelerated by a tertiary aromatic amine accelerator present in an amount within the range of from about 0.75 to about 1.75%, both based upon the weight of the resin. A lithium salt emulsifier is required to insure stability of the emulsion, which emulsifier is present in an amount within the range of from about 0.5 to about 1.5% based on the weight of the resin.

Other advantages of the present invention will be apparent to those skilled in the art upon examination of the following detailed description of preferred embodiments.

DETAILED DESCRIPTION OF THE INVENTION

The present invention departs radically from the direction of the prior art in respect of the formation and curing of water-in-resin emulsions where the resin component is an unsaturated polyester. The normative wisdom of those skilled in the art has pointed to the need for high levels of cobalt salt promoters, such as cobalt octoate or cobalt naphthenate, along with a tertiary aromatic amine, such as dimethyl aniline or dimethyl toluidine, in order to cure effectively the unsaturated polyester resin which constitutes the continuous phase of the emulsion. On the contrary, the cobalt-amine curing system of the present invention does not differ substantially from the same system used to promote the cure of unsaturated polyester resins in a nonaqueous environment, employing cobalt at a level thought by others to be too low in an aqueous environment.

The continuous phase in the emulsion of the present invention is a copolymerizable mixture containing a liquid unsaturated polyester of a polyhydric alcohol and saturated and ethylenically unsaturated dicarboxylic acid and a compound having a copolymerizable $CH_2=C<$ group. The molecular weight of the resinous component of the present invention is less than about 3500, preferably between about 2500 and about 3500, and most preferably from about 2900 to 3300. As used herein, the term molecular weight refers to the number average molecular weight ($M_n$) as determined by gel permeation chromatography using polystyrene standards.

The most preferred unsaturated polyester resin for use in preparing emulsions in accordance with the present invention is a blend of two resins, a rigid isophthalic resin and a urethane modified flexible resin, along with conventional polymerization inhibitors, promoters, and the lithium salt emulsifier, cut with styrene monomer to a final non-volatile content in the range of from about 30 to about 50%, preferably in the range of from about 35 to about 45%, and most preferably to about 40%.

This preferred resin blend is exemplified below:

EXAMPLE 1

This example illustrates the preparation of the various unsaturated polyester resins used in following examples. Unsaturated polyester resins A & B were prepared, using conventional laboratory equipment for unsaturated polyester resin preparation familiar to those skilled in the art.

Resin A is a rigid, medium reactive, high molecular weight, 2-stage isophthalic type, unsaturated polyester resin. It is prepared by reacting 2.1 moles of propylene glycol with 1.0 mole of isophthalic acid at esterification temperatures of 180°–225° C. to an acid number of 20 or less. One mole of maleic anhydride is then added and reacted at esterification temperatures of 180°–215° C. to a molecular weight ($M_n$) of 2700–3300 as confirmed by gel permeation chromatography using polystyrene standards. This end point is established by controlling to a Gardner viscosity of X-Y and an acid number of 5–10 cut 60% non-volatile in inhibited styrene monomer. The finished polyester alkyd is then cut to 60% non-volatile in inhibited styrene monomer. The inhibitors used are conventional catechol and quinone types familiar to those skilled in the art. The following quantities of the following ingredients are combined as indicated above to form Resin A:

| Ingredient | Quantity (grams) |
| --- | --- |
| Propylene Glycol | 1596 |
| Isophthalic Acid | 1660 |
| Maleic Anhydride | 980 |
| Styrene Monomer* | 2464 |

*Containing 300 ppm. inhibitor.

Resin B is a flexible, low reactive, high molecular weight, single stage, isocyanate-modified, adipic type, unsaturated polyester resin. It is prepared by reacting 5.0 moles of diethylene glycol with 3.75 moles of adipic acid and 1.0 mole of maleic anhydride at esterification temperatures of 160°–215° C. It is controlled to an end point established by a Gardner viscosity of W and an acid number of 5–10 cut 80% non-volatile in inhibited styrene monomer. The finished polyester alkyd is then cut to 45% non-volatile in inhibited styrene monomer. The inhibitors used are conventional catechol and quinone types familiar to those skilled in the art. The cut resin is then modified with one to two percent of a quasi-prepolymer of toluene diisocyanate with 31.5–32.5% NCO to a molecular weight ($M_n$) of 3000–4000 as confirmed by gel permeation chromatography using polystyrene standards. This molecular weight modification is carried out at a temperature of 50°–55° C. The reaction is catalyzed, using conventional metal catalysts familiar to those skilled in the art. Upon reaching the proper molecular weight as confirmed by a Gardner viscosity of C-D, the excess NCO is neutralized by the addition of 0.5% of a low molecular weight glycol and reinhibited using conventional inhibitors familiar to those skilled in the art. The following quantities of the following ingredients are combined as indicated above to form Resin B:

| Ingredient | Quantity (grams) |
| --- | --- |
| Diethylene Glycol | 530 |
| Adipic Acid | 547 |
| Maleic Anhydride | 98 |
| Styrene Monomer* | 1250 |
| Dibutyl tin dilaurate | 2.3 |
| Quasi Prepolymer of TDI | 37 |
| Propylene Glycol | 11.4 |
| Inhibitor | 0.9 |

*Containing 500 ppm. of inhibitor.

Resin C is prepared by using Resins A & B, prepared as described above, and blending them together with additional styrene monomer and conventional levels of promoters, accelerators, and inhibitors, all of which are familiar to those skilled in the art of unsaturated polyester resin technology. The following quantities of the following ingredients are combined as indicated above to form Resin C:

| Ingredient | Quantity Grams | % |
| --- | --- | --- |
| Resin A | 14350 | 41 |
| Resin B | 11200 | 32 |
| Styrene Monomer* | 8837 | 25.25 |
| 12% Cobalt Octoate Promoter | 123 | .35 |
| Dimethyl Aniline Accelerator | 350 | 1.0 |
| Dimethyl-p-Toluidine Accelerator | 140 | .4 |
| TOTAL | 35000 | 100.00 |

*Contains 400 ppm. Tert-butyl Catechol inhibitor.

Resin D is prepared by blending Resin C, as described above, with the emulsifying agent in the following proportions:

| Ingredient | Quantity Grams | % |
| --- | --- | --- |
| Resin C | 35000 | 99.25 |
| 2% Lithium Neodecanoate | 265 | .75 |
| TOTAL | 35265 | 100.00 |

Various other polyester resins or resin blends having a reactivity similar to Resin C described in Example 1 can be substituted therefor. Should another equivalent resin be used, however, it should be insured that the molecular weight ranges specified above be maintained. Regardless of the resin employed, it should contain sufficient polymerization inhibitor to retard premature gelation of the polyester resin. Suitable inhibitors for this purpose are enumerated in U.S. Pat. No. 4,077,931 and No. 3,840,618. When the most preferred resin composition outlined above is used, the inhibitor is advantageously incorporated through the two base resins. Those skilled in the polyester resin art will have no difficulty in the selection of appropriate inhibitors, concentrations thereof, and methods of incorporation into the resin, since all are conventional in nature.

The resin phase of the emulsion is cured by addition of a free radical generating catalyst, such as methyl ethyl ketone peroxide, hydrogen peroxide, or other similar peroxides typically used to catalyze the cure of polyester resins. The cobalt constituent of the cobalt salt promoter aids in the generation of free radicals provided by the catalyst, thus speeding up the cure of the polyester. Any of the conventional cobalt salts typically used for this purpose, such as 12% cobalt octoate or 6% cobalt naphthenate, may be employed in the present invention. These compounds are added in the same general range as for polyesters cured in the absence of water. That is, the cobalt salt should be present in the range of from about 0.25% to a maximum of about 0.5% based on the weight of the resin, for 12% concentration salts. Obviously, if a different salt having a cobalt concentration more or less than 12% cobalt metal is used, this range should be appropriately adjusted.

Contrary to other promoter systems for curing water-in-resin emulsions of polyester resins, the amount of cobalt promoter used in the present invention is not only substantially less than that heretofore used but it is relatively insensitive to differences in the molecular weight of the resin, provided it is within the range of about 2500–3500. The actual amount necessary for effective cure of the resin varies more directly with the amount of filler loading in the emulsion which is also true with non-aqueous filled polyesters. The amount of cobalt salt promoter, for most purposes, will rarely exceed about 0.35–0.4% for resins in the specified range of molecular weights. For an emulsion of about 50% water and 50% resin blend, about 0.25% cobalt octoate or the % metal equivalent of cobalt naphthenate is usually sufficient. For an emulsion having the same 1:1 ratio of water and resin blend and further including up to about 10–15% filler (such as hydrated alumina), about 0.25–0.3% cobalt octoate or the % metal equivalent of cobalt naphthenate gives very good results. When more filler is added, an increase in the amount of cobalt necessary to cure the emulsion properly is required as is also typical in a filled non-aqueous polyester. For example, in a 1:1:1 ratio of hydrated alumina:water:resin blend, it may require as much as 0.45–0.5% cobalt octoate to achieve suitable gel times.

The promoter activity of the cobalt salt is accelerated by a conventional tertiary aromatic amine typically used for this purpose. Those amines most preferred for the present invention are dimethyl aniline (DMA), dimethyl toluidine (DMT), and mixtures thereof. The total amount of accelerator will generally be within the range of from about 0.75 to about 1.75% based on the weight of the resin. A particularly good accelerator blend is comprised of about 1.0% by weight DMA and about 0.4% by weight DMT.

The emulsion of the present invention is stabilized by the presence of a lithium salt emulsifier. Any lithium salt soluble in the resin may be used. The most preferred lithium salt is lithium neodecanoate (2% by weight lithium metal) which gives very good results when present in an amount within the range of from about 0.5 to about 1.5% by weight based on the total weight of the resin. Since emulsion stability is influenced by such factors as temperature and filler loading (including water fill), a lithium salt content on the upper end of this range is necessary under extreme process conditions. However, amounts of lithium salt in substantial excess of 1.5% by weight has been found to interfere with the gel and cure of the resin, whereas amounts below about 0.5% are generally insufficient to obtain good emulsion stability. Under most circumstances, lithium neodecanoate (2% lithium by weight) used at about 0.75–1.25% by weight, and preferably about 1.0% weight, insures very good emulsion stability. As with the cobalt salt promoter, if a lithium salt having a lithium concentration more or less than 2% metal is used, the range specified above should be appropriately changed.

The following examples illustrate further the manner in which the present invention may be practiced.

EXAMPLE 2

This example illustrates the improved emulsion, gel, and cure characteristics of Resin D which contains the lithium neodecanoate emulsifier as compared to Resin C which does not. Resins C and D, as prepared in Example 1, were individually emulsified with equal parts, by weight, of water. This emulsification was carried out at 77° F. by slowly adding 77° F. water to 77° F. resin under high shear agitation to form a water-in-oil phase emulsion. The emulsions were then tested for viscosity and stability as indicated by viscosity decay and phase separation. They were also tested for gel and cure when catalyzed at 77° F. with 1% (based on resin) of RCI 46-738 methyl ethyl ketone peroxide catalyst. Table I reports the results from the tests.

TABLE I

|  | RESIN C | COMMENTS | RESIN D | COMMENTS |
|---|---|---|---|---|
| Emulsion Visc. (1) | 580 CPS. | Slightly Yellow Emulsion | 590 CPS. | Proper White Emulsion No Water on Surface |
| Emulsion Visc. (2) | 520 CPS. | Yellow Emulsion | 584 CPS. | Proper White Emulsion No Water on Surface |
| Emulsion Visc. (3) | 460 CPS. | Yellow Emulsion-Viscosity Decaying-Water on Surface | 580 CPS. | Proper White Emulsion No Water on Surface No Viscosity Decay |
| Emulsion Gel (1)* | 33' | Very Long & Sluggish | 2'05" | Very Snappy Gel |
| Emulsion Gel (2)* | 38' | Very Long & Sluggish Curdy Soft Gel | 1'50" | Very Snappy Gel |
| Emulsion Gel (3)* | 53' | Emulsion Broke When Catalized | 1'30" | Very Snappy Gel |
| Time to Peak Temp. (1)* | 69'@168° F. | Soft-Not Cured | 11'@200° F. | Properly Cured |
| Time to Peak Temp. (2)* | 80'@155° F. | Very Soft-Not Cured Much Water on Surface. | 10'30"@201° F. | Properly Cured |
| Time to Peak Temp. (3)* | 110'@150° F. | Very Soft. Not Cured | 10'@202° F. | Properly Cured |

(1) immediately after emulsion preparation @77° F.
(2) 1 hour after emulsion preparation @77° F.
(3) 24 hours after emulsion preparation @77° F.
*100 gm. mass, catalyst stirred in with minimum shear. Exotherm recorded in center of mass.

EXAMPLE 3

This example illustrates the effect of the lithium neodecanoate emulsifier on gel and cure times of Resin D as compared to Resin C before emulsifying with water. The resins, as prepared in Example I, were tested for viscosity and for gel and cure when catalyzed at 77° F. with 1% of RCI 46-738 methyl ethyl ketone peroxide catalyst. The data from these tests are reported in Table II.

TABLE II

|  | RESIN C | RESIN D |
|---|---|---|
| Resin Visc. (1) | 53 CPS | 62 CPS |
| Resin Visc. (2) | 53 CPS | 62 CPS |
| Resin Visc. (3) | 53 CPS | 62 CPS |
| Resin Gel (1)* | 40" | 2'25" |
| Resin Gel (2)* | 39" | 2'15" |
| Resin Gel (3)* | 39" | 2'10" |
| Time to Peak Temp. (1)* | 7'00" @ 353° F. | 9'30" @ 367° F. |
| Time to Peak Temp. (2)* | 6'45" @ 364° F. | 9'30" @ 368° F. |
| Time to Peak Temp. (3)* | 6'30" @ 363° F. | 9'00" @ 368° F. |
| Molecular Weight ($M_n$) | 3365 | 3241 |

(1) Immediately after preparation of resin as outlined in Example I @ 77° F.
(2) 1 hour after preparation of resin as outlined in Example I @ 77° F.
(3) 24 hours after preparation of resin as outlined in Example I @ 77° F.
*100 gm. mass - exotherm recorded in center of mass.

EXAMPLE 4

This example illustrates the preparation of various unsaturated polyester resins to be used in the following examples. Resin E is prepared by using rigid unsaturated polyester resin A, as prepared in Example I, and blending it with additional styrene monomer and conventional levels of promoters, accelerators and inhibitors all of which are familiar to those skilled in the art of unsaturated polyester resin technology. The following quantities of the following ingredients are combined as indicated above to form Resin E.

| Ingredient | Quantity Grams | % |
|---|---|---|
| Resin A | 20400 | 58.29 |
| Styrene Monomer* | 13987 | 39.96 |
| 12% Cobalt Octoate Promoter | 123 | .35 |
| Dimethyl Aniline Accelerator | 350 | 1.0 |
| Dimethyl-p-Toluidine Accelerator | 140 | .4 |
| TOTAL | 35000 | 100.00 |

*Contains 50 ppm Tert-butyl Catechol inhibitor

Resin F is prepared by blending Resin E, as described above, with the lithium neodecanoate emulsifying agent. The following quantities of the following ingredients are combined to form Resin F.

| Ingredients | Quantity Grams | % |
|---|---|---|
| Resin E | 35000 | 99.25 |
| 2% Lithium Neodecanoate | 265 | .75 |
| TOTAL | 35265 | 100.00 |

Resin G is prepared by using flexible unsaturated polyester Resin B as prepared in Example I and blending it with conventional levels of promoters and accelerators all of which are familiar to those skilled in the art of unsaturated polyester resin technology. The following quantities of the following ingredients are combined to form Resin G.

| Ingredient | Quantity Grams | % |
|---|---|---|
| Resin B | 32000 | 91.43 |
| Styrene Monomer* | 2387 | 6.82 |
| 12% Cobalt Octoate Promoter | 123 | .35 |
| Dimethyl Aniline Accelerator | 350 | 1.0 |
| Dimethyl-p-Toluidine Accelerator | 140 | .4 |
| TOTAL | 35000 | 100.00 |

*Contains 50 ppm of Tert-Butyl Catechol

Resin H is prepared by blending Resin G, as described above, with the lithium neodecanoate emulsifying agent. The following quantities of the following ingredients are combined to form Resin H.

| Ingredients | Quantity Grams | % |
|---|---|---|
| Resin G | 35000 | 99.25 |
| 2% Lithium Neodecanoate | 265 | .75 |
| TOTAL | 35265 | 100.00 |

EXAMPLE 5

This example illustrates the improved emulsion, gel and cure characteristics of Resin F which contains the lithium neodecanoate emulsifier as compared to Resin E which does not. Resin E & F as prepared in Example 4 were individually emulsified with equal parts, by weight, of water. This emulsification was carried out at 77° F. by slowly adding the water to the 77° F. resin under high shear agitation to form a water-in-oil phase emulsion. The emulsions were then tested for viscosity and stability as indicated by viscosity decay and phase separation. They were also treated for gel and cure when catalyzed at 77° F. with 1% (based on resin) of RCI 46-738 methyl ethyl ketone peroxide catalyst. The data from these tests are reported in Table III.

TABLE III

|  | RESIN E | COMMENTS | RESIN F | COMMENTS |
|---|---|---|---|---|
| Emulsion Visc. (1) | 398 CPS. | Off White Emulsion Slight Water On Surface | 480 CPS. | Proper White Emulsion-No Water |
| Emulsion Visc. (2) | 372 CPS. | Yellow Emulsion Slight Water On Surface | 470 CPS. | Proper White Emulsion-No Water |
| Emulsion Visc. (3) | 360 CPS. | Yellow Emulsion Slight Water on Surface-Some Viscosity Decay Soft-Curdy | 470 CPS. | Proper White Emulsion-No Water |
| Emulsion Gel (1)* | 5'05" | Poor Gel | 59" | Very Snappy Gel |
| Emulsion Gel (2)* | 4'10" | Poor Gel. Some Water Droplets Formed | 58" | Very Snappy Gel |
| Emulsion Gel (3)* | 7'30 | Yellow Emulsion Emulsion Breaking When Catalyzed | 53" | Very Snappy Gel |

TABLE III-continued

|  | RESIN E |  | COMMENTS | RESIN F | COMMENTS |
|---|---|---|---|---|---|
| Time to Peak (1)* | 15'40" @ 211° F. |  | Soft-Undercured | 7' @ 212° F. | Properly Cured |
| Time to Peak (2)* | 12'40" @ 212° F. |  | Soft-Undercured | 7'30" @ 212° F. | Properly Cured |
| Time to Peak (3)* | 20'30" @ 208° F. |  | Soft-Undercured | 7'15" @ 212° F. | Properly Cured |

(1) Immediately after emulsion preparation @ 77° F.
(2) 1 hour after emulsion preparation @ 77° F.
(3) 24 hours after emulsion preparation @ 77° F.
*100 gm. mass, catalyst stirred in which minimum shear. Exotherm recorded in center of mass.

EXAMPLE 6

This example illustrates the effect of the lithium neodecanoate emulsifier on the gel and cure times of Resin E as compared to Resin F before emulsifying with water. The resins as prepared in Example 4 were tested for viscosity and for gel and cure when catalyzed at 77° F. with 1% RCI 46-738 methyl ethyl ketone peroxide catalyst. The data from these tests are reported in Table IV.

EXAMPLE 7

This example illustrates the improved emulsion, gel and cure characteristics of Resin H which contains the lithium neodecanoate emulsifier as compared to Resin G which does not. Resin G & H as prepared in Example 4 were individually emulsified with equal parts, by weight, of water. This emulsification was carried out at 77° F. by slowly adding the water to the 77° F. resin under high shear agitation to form a water-in-oil phase emulsion. The emulsions were then tested for viscosity and stability as indicated by viscosity decay and phase separation. They were also tested for gel and cure when catalyzed at 77° F. with 1% (based on resin) of RCI 46-738 methyl ethyl ketone peroxide catalyst. The data from these tests are reported in Table V.

TABLE V

|  | RESIN G | COMMENTS | RESIN H | COMMENTS |
|---|---|---|---|---|
| Emulsion Visc. (1) | 500 CPS. | Proper White Emulsion | 580 CPS. | Proper White Emulsion |
| Emulsion Visc. (2) | 502 CPS. | Slightly Yellow Emulsion | 582 CPS. | Proper White Emulsion |
| Emulsion Visc. (3) | 496 CPS. | Yellow Emulsion | 576 CPS. | Proper White Emulsion |
| Emulsion Gel (1)* | Soft Gel In 24 Hours | Some Emulsion Failure When Catalyzed | 8'20" | Firm Snappy Gel |
| Emulsion Gel (2)* | Soft Gel in 24 Hours | Some Emulsion Failure When Catalyzed | 7"05" | Firm Snappy Gel |
| Emulsion Gel (3)* | Soft Gel in 24 Hours | Some Emulsion Failure When Catalyzed | 5'35" | Firm Snappy Gel |
| Time to Peak (1)* | No Exotherm | No Cure, Water Separation-Large Cells, Brown on Top-Soft Like Jello | 28' @ 172° F. | Properly Cured |
| Time to Peak (2)* | No Exotherm | No Cure, Water Separation-Large Cells, Brown on Top-Soft Like Jello | 28' 169 170° F. | Properly Cured |
| Time to Peak (3)* | No Exotherm | No Cure, Water Separation-Large Cells, Brown on Top-Soft Like Jello | 25'30" @ 171° F. | Properly Cured |

(1) Immediately after emulsion preparation @ 77° F.
(2) 1 hour after emulsion preparation @ 77° F.
(3) 24 hours after emulsion preparation @ 77° F.
*100 gm. mass, catalyst stirred in with minimum shear. Exotherm Recorded in center of mass.

TABLE IV

|  | RESIN E | RESIN F |
|---|---|---|
| Resin Visc. (1) | 42 CPS. | 53 CPS. |
| Resin Visc. (2) | 42 CPS. | 53 CPS. |
| Resin Visc. (3) | 42 CPS. | 53 CPS. |
| Resin Gel (1)* | 23" | 50" |
| Resin Gel (2)* | 22" | 51" |
| Resin Gel (3)* | 21" | 46" |
| Time to Peak Temp. (1)* | 3'35" @ 337° F. | 7'45" @ 362° F. |
| Time to Peak Temp. (2)* | 3'45" @ 334° F. | 7'20" @ 372° F. |
| Time to Peak Temp. (3)* | 4'00" @ 338° F. | 6'45" @ 370° F. |
| Molecular Weight ($M_n$) | 3048 | 2986 |

(1) Immediately after preparation of resin as outlined in Example I @ 77° F.
(2) 1 hour after preparation of resin as outlined in Example I @ 77° F.
(3) 24 hours after preparation of resin as outlined in Example I @ 77° F.
*100 gm. mass - exotherm recorded in center of mass.

EXAMPLE 8

This example illustrates the effect of the lithium neodecanoate on the gel and cure times of Resin G as compared to Resin H before emulsifying with water. The resins as prepared in Example 4 were tested for viscosity and for gel and cure when catalyzed at 77° F. with 1% RCI 46-738 methyl ethyl ketone peroxide catalyst. The data from these tests are reported in Table VI.

TABLE VI

|  | RESIN G | RESIN H |
|---|---|---|
| Resin Visc. (1) | 58 CPS. | 68 CPS. |
| Resin Visc. (2) | 57 CPS. | 68 CPS. |
| Resin Visc. (3) | 58 CPS. | 68 CPS. |
| Resin Gel (1)* | 2'35" | 4'55" |
| Resin Gel (2)* | 2'32" | 4'55" |
| Resin Gel (3)* | 2'43" | 4'56" |
| Time to Peak Temp. (1)* | 16' @ 267° F. | 16'20" @ 287° F. |
| Time to Peak Temp. (2)* | 16' @ 270° F. | 16'45" @ 290° F. |
| Time to Peak Temp. (3)* | 16' @ 269° F. | 16'30" @ 287° F. |

TABLE VI-continued

| | RESIN G | RESIN H |
|---|---|---|
| Molecular Weight ($M_n$) | 3831 | 3908 |

(1) Immediately after preparation of resin as outlined in Example I @ 77° F.
(2) 1 hour after preparation of resin as outlined in Example I @ 77° F.
(3) 24 hours after preparation of resin as outlined in Example I @ 77° F.
*100 gm. mass - exotherm recorded in center of mass.

It is preferred practice for purposes of this invention to add the inhibitor, promoter, accelerator and emulsifier to the resin at the time of its manufacture. The resin is then stored for future use, at which time an emulsion of water in the resin (with or without other filler) is prepared by agitation of the resin and addition of water thereto during agitation. Once the emulsion is formed, catalyst is added and the catalyzed emulsion charged to a mold in the desired shape of the article to be produced. Catalysis of the promoted resin emulsion with about 1.0% methyl ethyl ketone peroxide gives a gel time of less than five minutes. Under normal circumstances (ambient temperature and moderate filler loading) gel times in the range of 1.5-2.5 minutes are standard. When operating within the preferred ranges outlined above, gel times in excess of three minutes are very rare.

Accordingly, and notwithstanding the substantial reduction in the amount of cobalt salt promoter used in the present invention as compared with other similar promoter systems, very fine emulsions are obtained which rapidly cure to a solid thermoset structure. For polyester resins having a molecular weight in the range of 2500-3500, all of the advantages of the prior art are realized by following the present invention while permitting a considerable savings in the cost of production.

While the invention has now been described with reference to certain preferred embodiments and exemplified with respect thereto, those skilled in the art will appreciate that various substitutions, changes and omissions may be made without departing from the spirit thereof. Accordingly, it is intended that the scope of the present invention be limited solely by that of the following claims.

What is claimed is:

1. A water in resin emulsion comprising a mixture of water dispersed in discrete droplets in a continuous phase of a resinous, copolymerizable composition including:
   (a) a copolymerizable mixture containing a liquid unsaturated polyester of a polyhydric alcohol and saturated and ethylenically unsaturated dicarboxylic acids and a compound having a polymerizable $CH_2=C$ group, said copolymerizable mixture having a molecular weight in the range of from about 2500 to about 3500;
   (b) a cobalt salt promoter for promoting the cure of said copolymerizable mixture, present in an amount in the range of from about 0.25 to about 1.5% based on the weight of said copolymerizable mixture and a 12% cobalt content in said salt;
   (c) a tertiary aromatic amine accelerator for accelerating said promoter, present in an amount in the range of from about 0.75 to about 1.75% based on the weight of said copolymerizable mixture; and,
   (d) a lithium salt emulsifier for insuring the stability of an emulsion of water in said copolymerizable mixture upon agitation thereof, present in an amount in the range of from about 0.5 to about 1.5% based on the weight of said copolymerizable mixture and a 2% lithium content in said salt.

2. The emulsion of claim 1, wherein:
   (a) said promoter is present in the range of from about 0.3 to about 0.4%;
   (b) said accelerator is present in the range of from about 1.0 to about 1.5%; and,
   (c) said emulsifier is present in the range of from about 0.75 to about 1.25%.

3. The emulsion of claims 1 or 2, wherein:
   (a) said copolymerizable mixture is unsaturated polyester cut with styrene, having a molecular weight of from about 2900 to about 3300;
   (b) said promoter is selected from the group consisting of cobalt octoate and the % metal equivalent of cobalt naphthenate;
   (c) said accelerator is selected from the group consisting of dimethyl aniline, dimethyl toluidine and mixtures thereof; and,
   (d) said emulsifier is 2% lithium neodecanoate.

* * * * *